Figure 1:
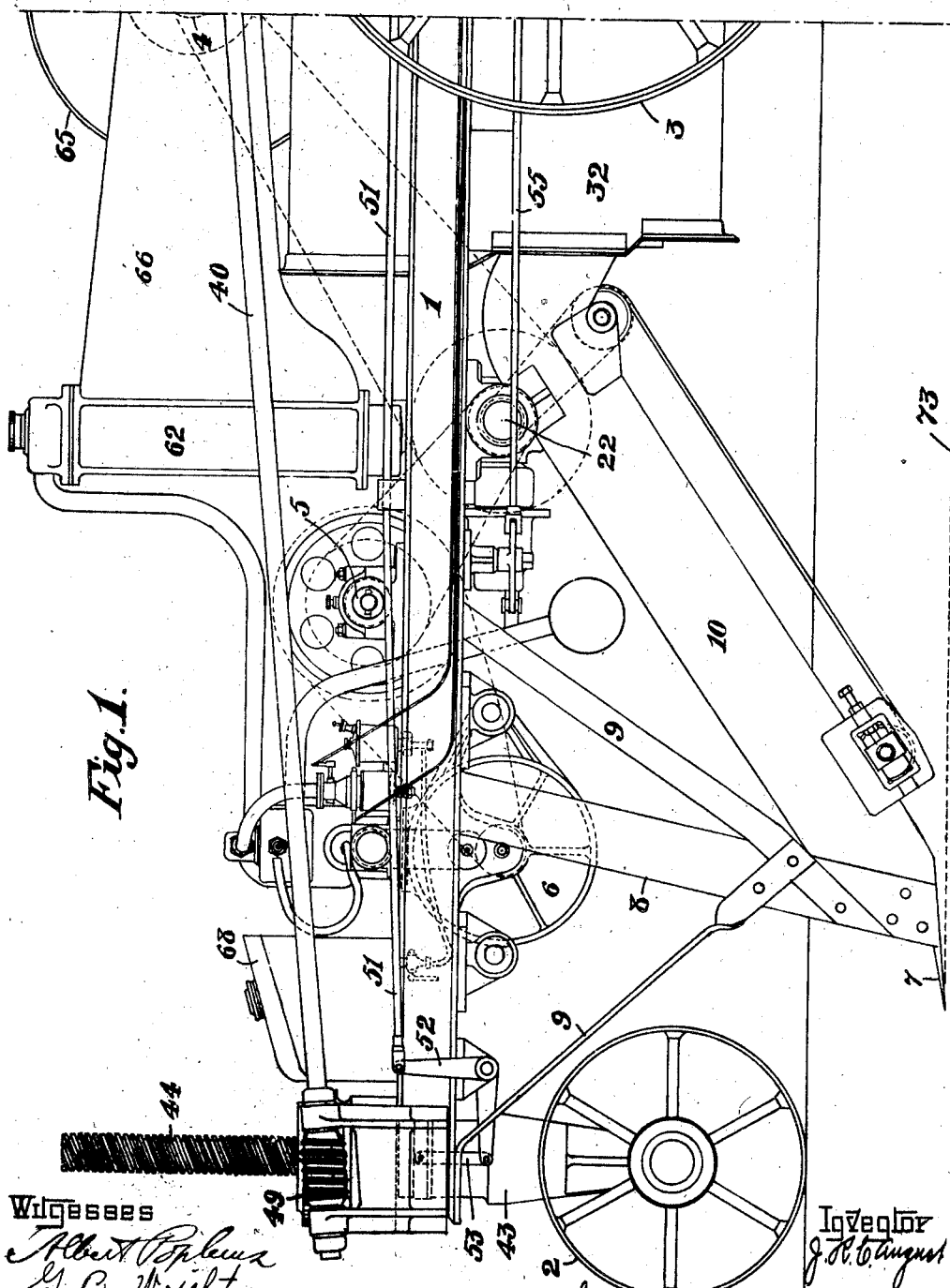

J. R. C. AUGUST.
METHOD FOR THE TREATMENT OF SOIL.
APPLICATION FILED NOV. 21, 1918.

1,303,149.

Patented May 6, 1919.
9 SHEETS—SHEET 1.

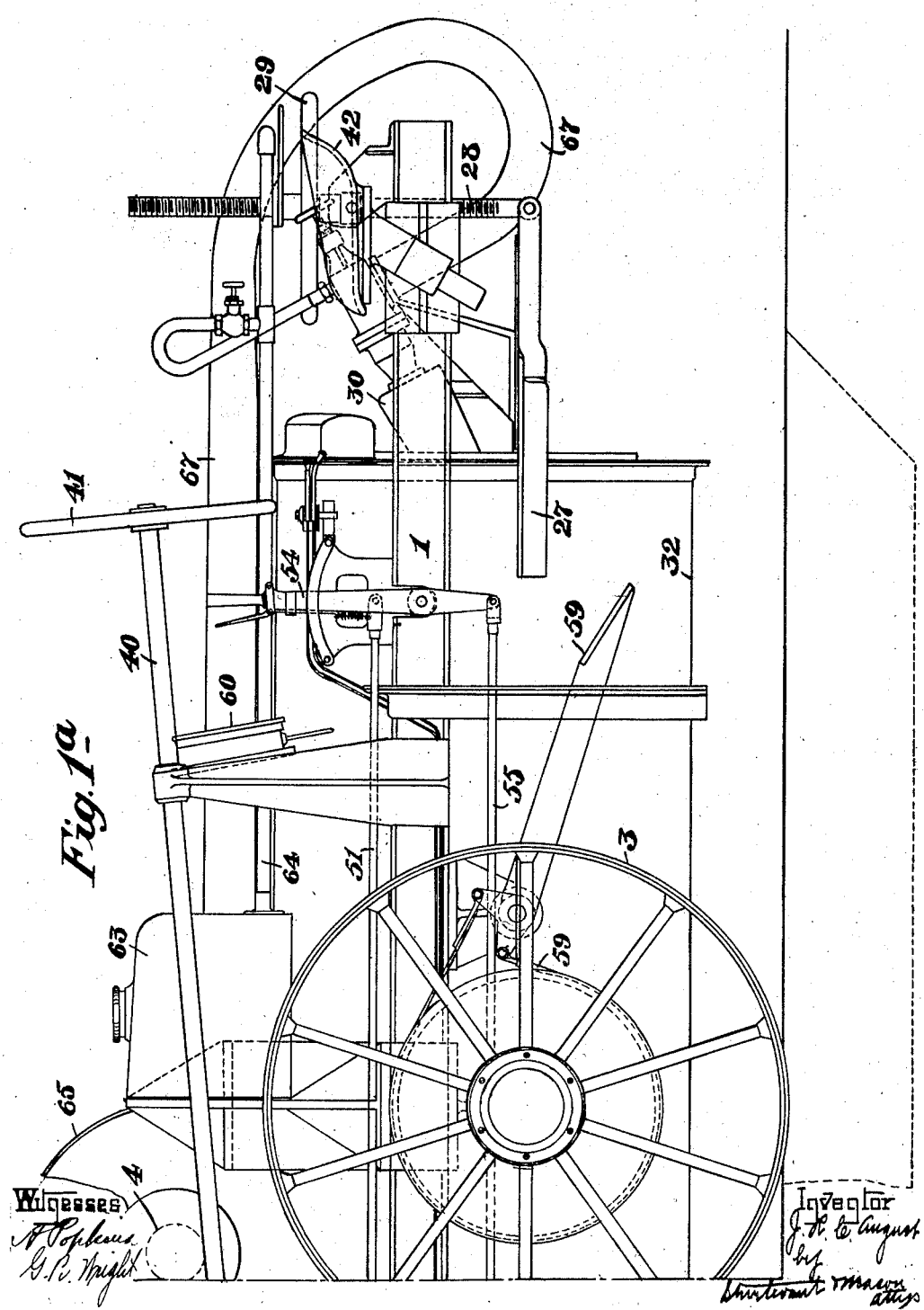

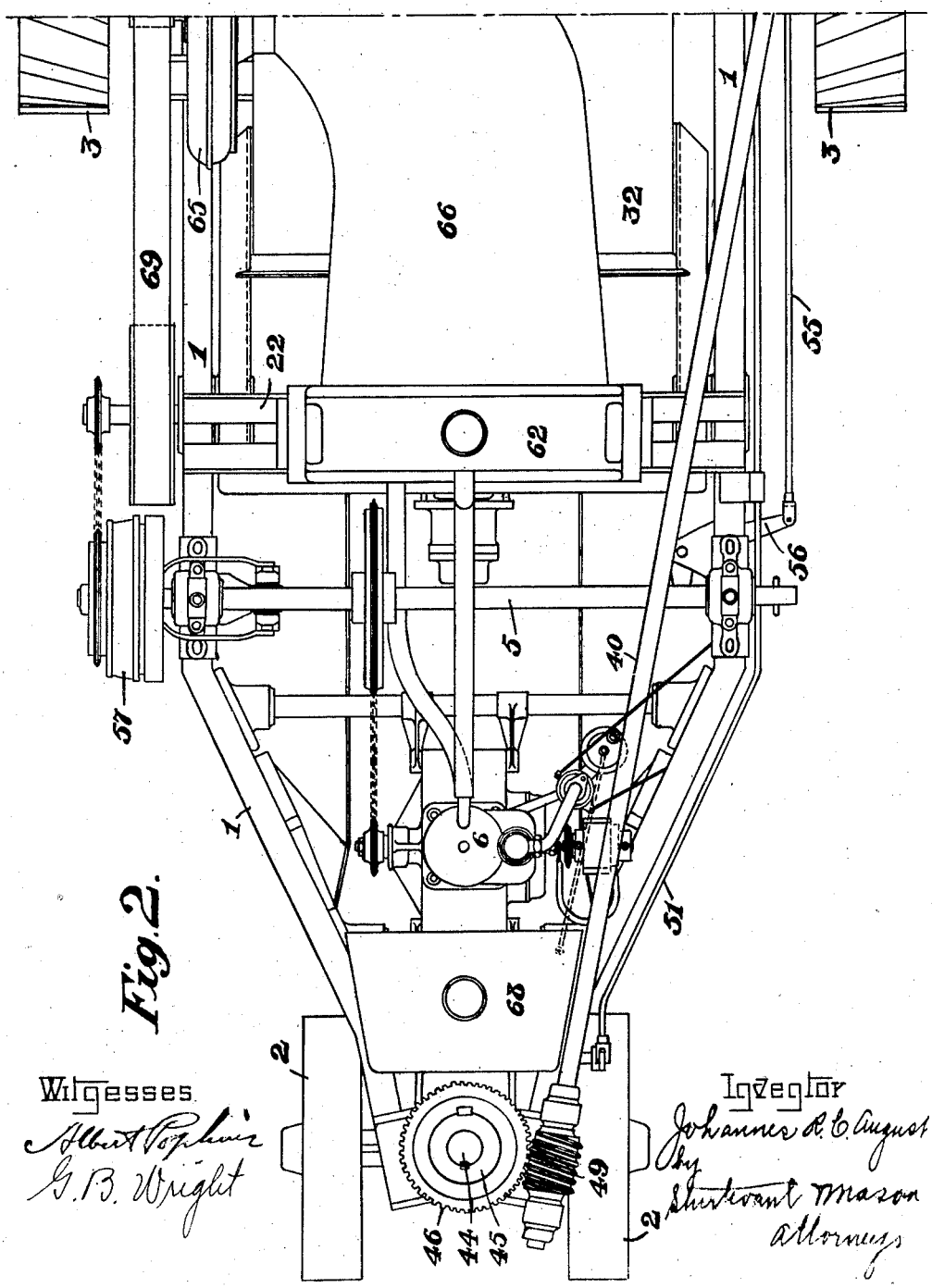

J. R. C. AUGUST.
METHOD FOR THE TREATMENT OF SOIL.
APPLICATION FILED NOV. 21, 1918.
1,303,149.
Patented May 6, 1919.
9 SHEETS—SHEET 4.
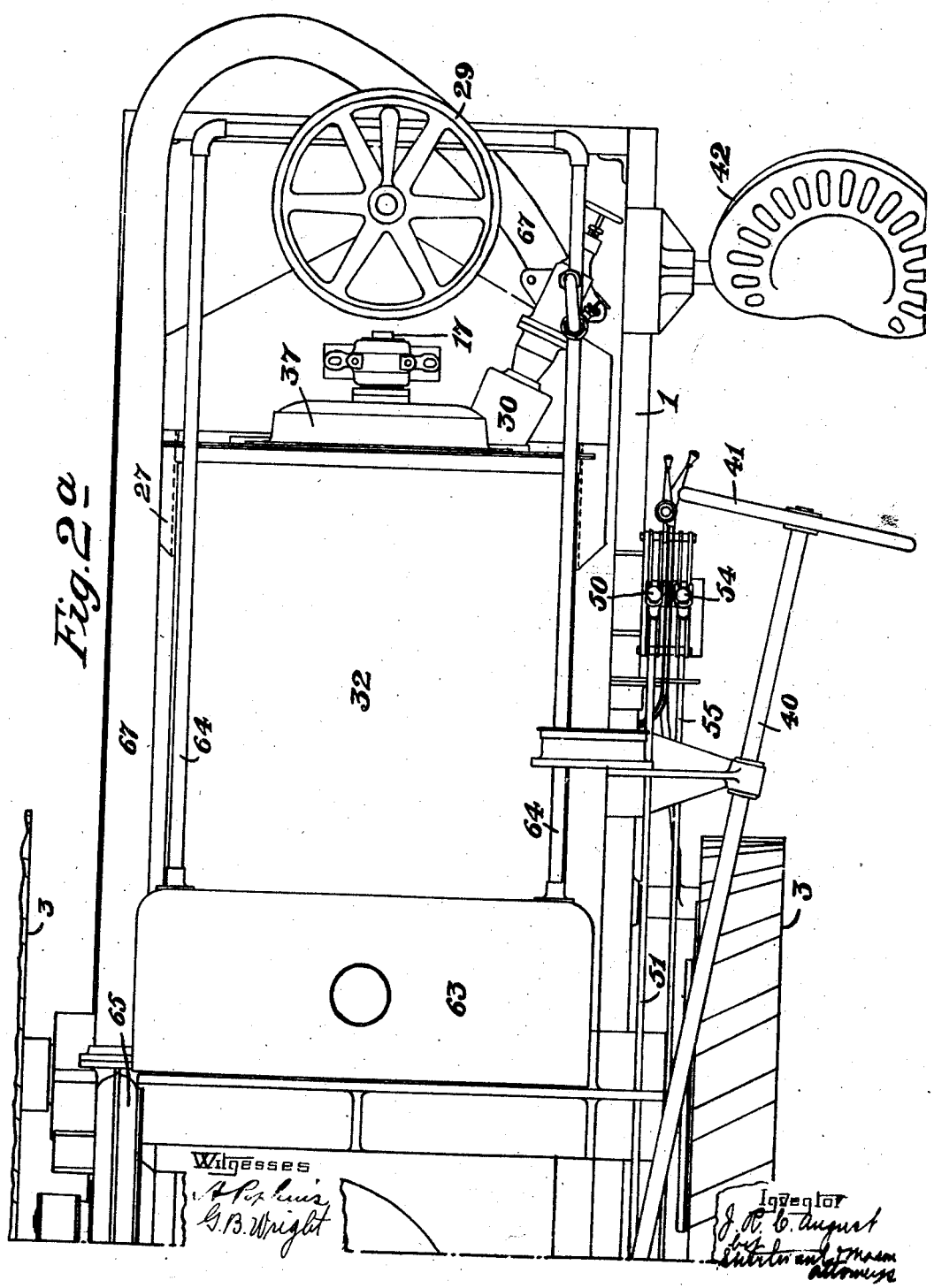

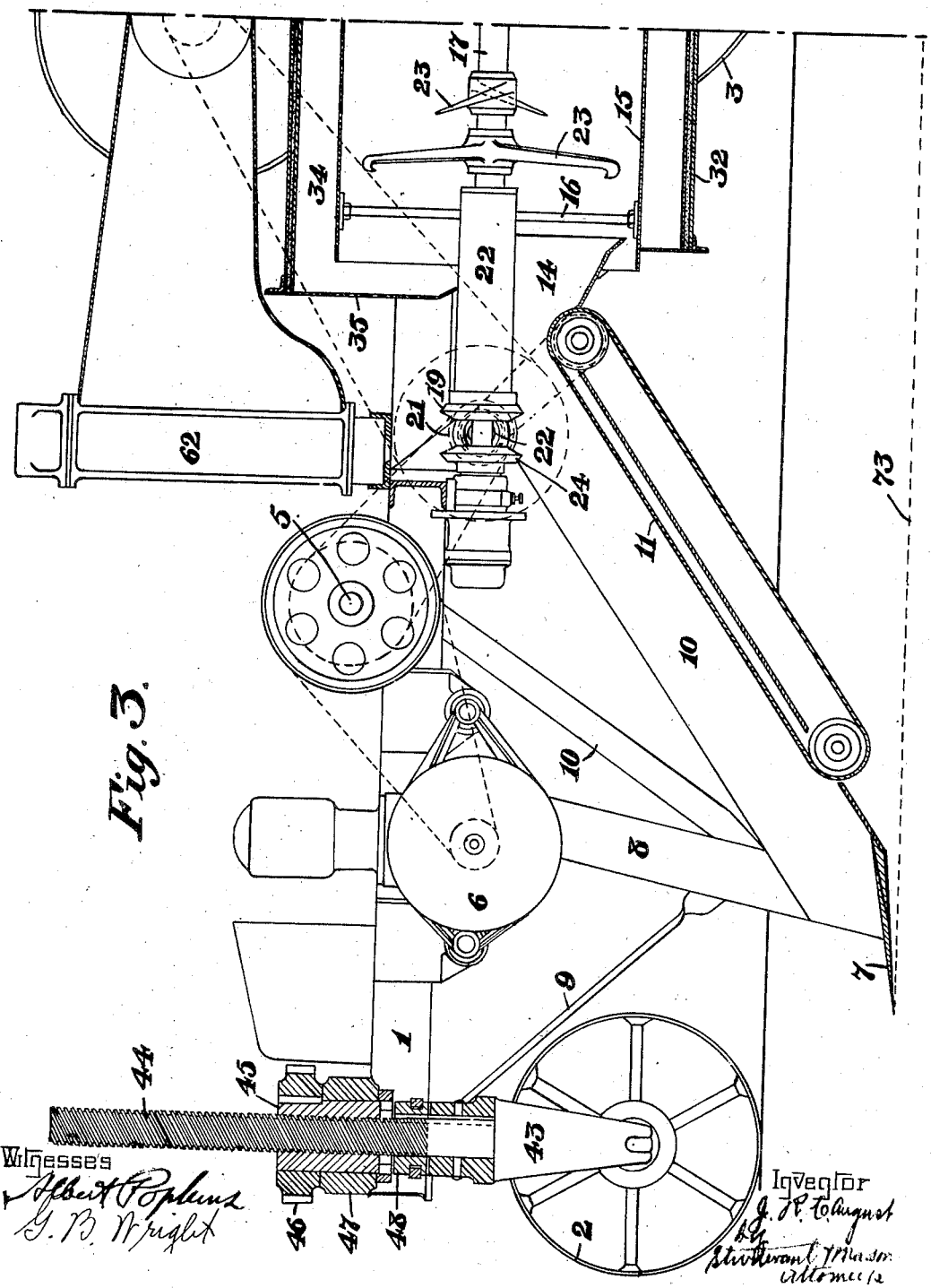

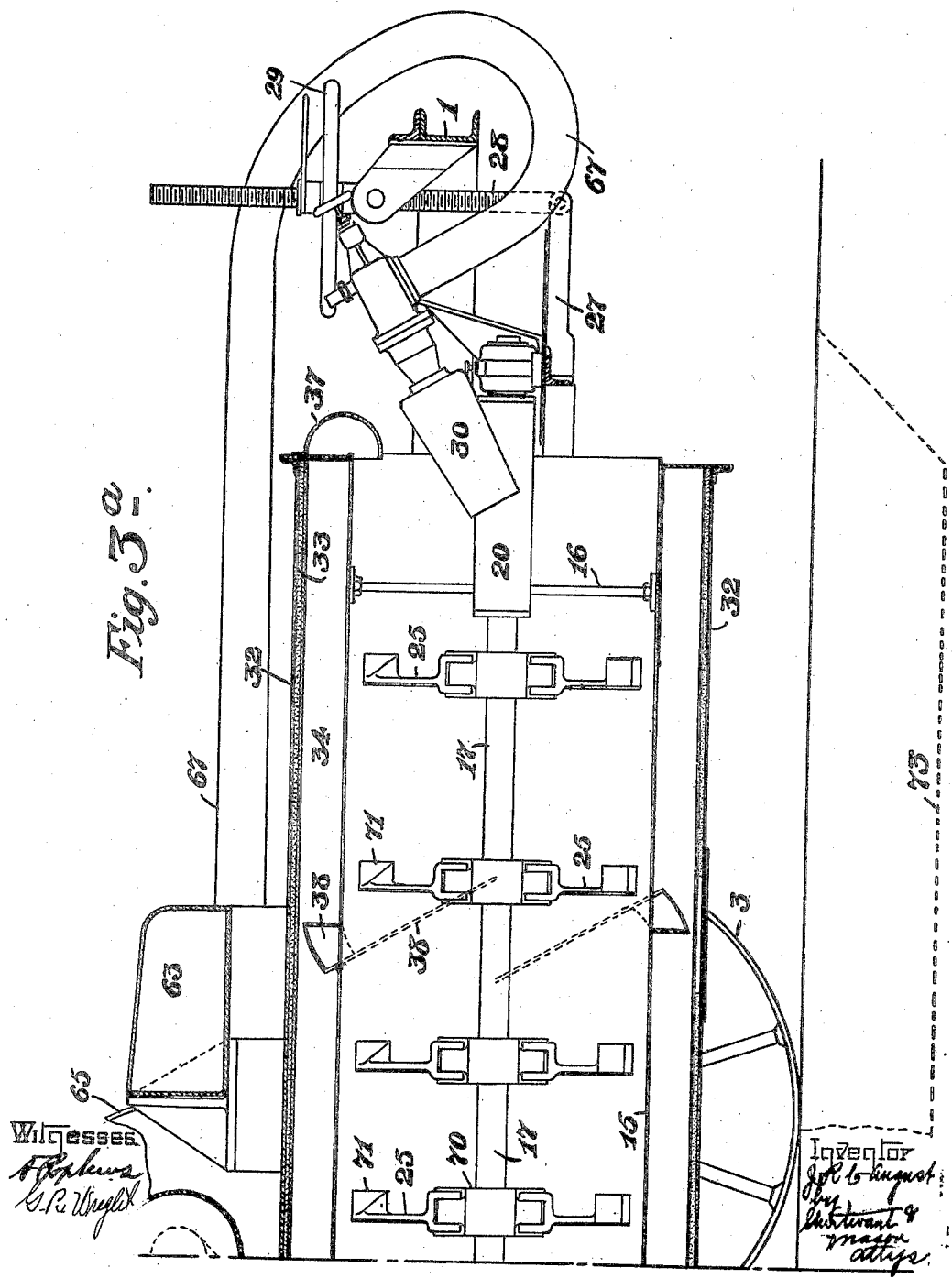

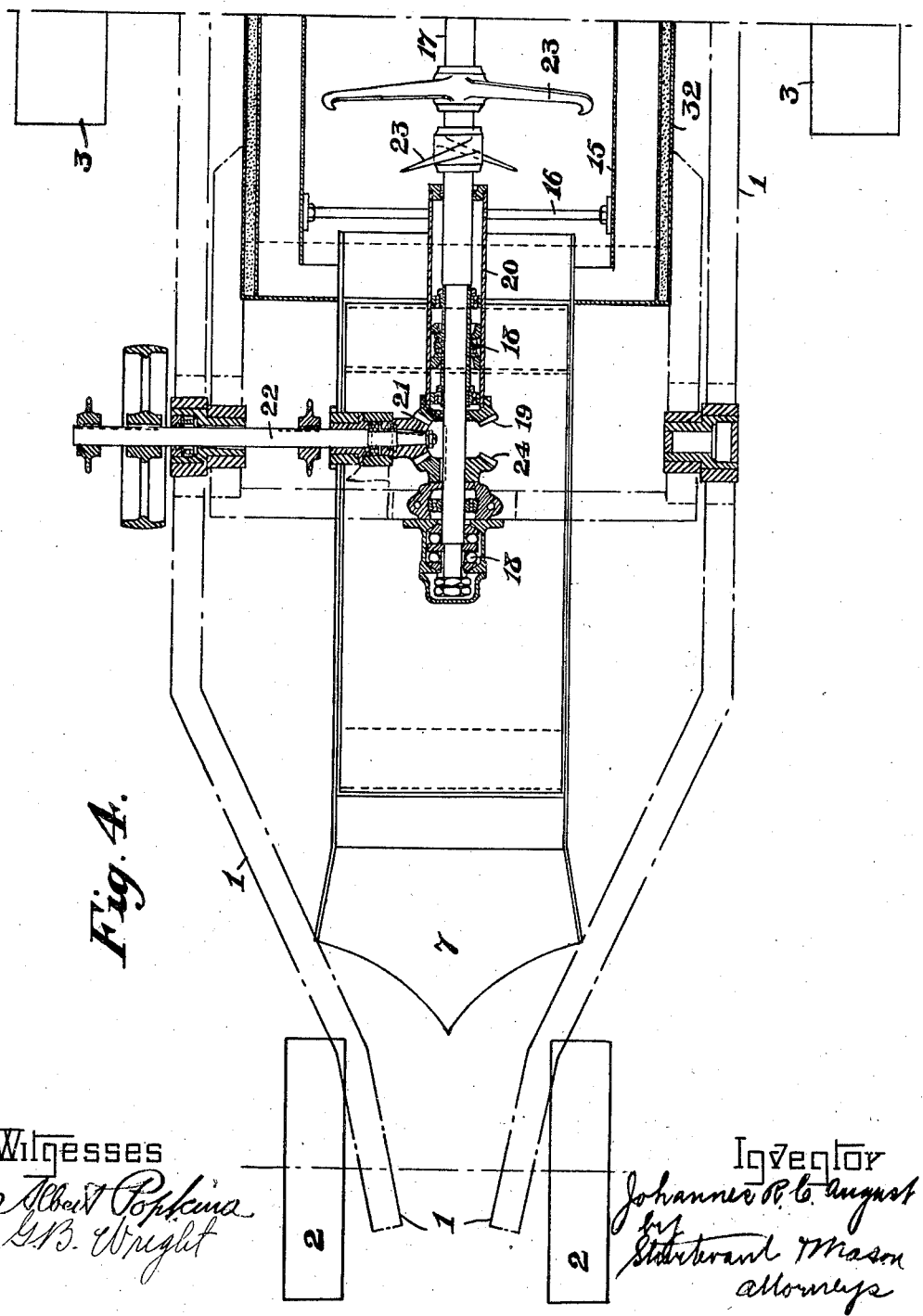

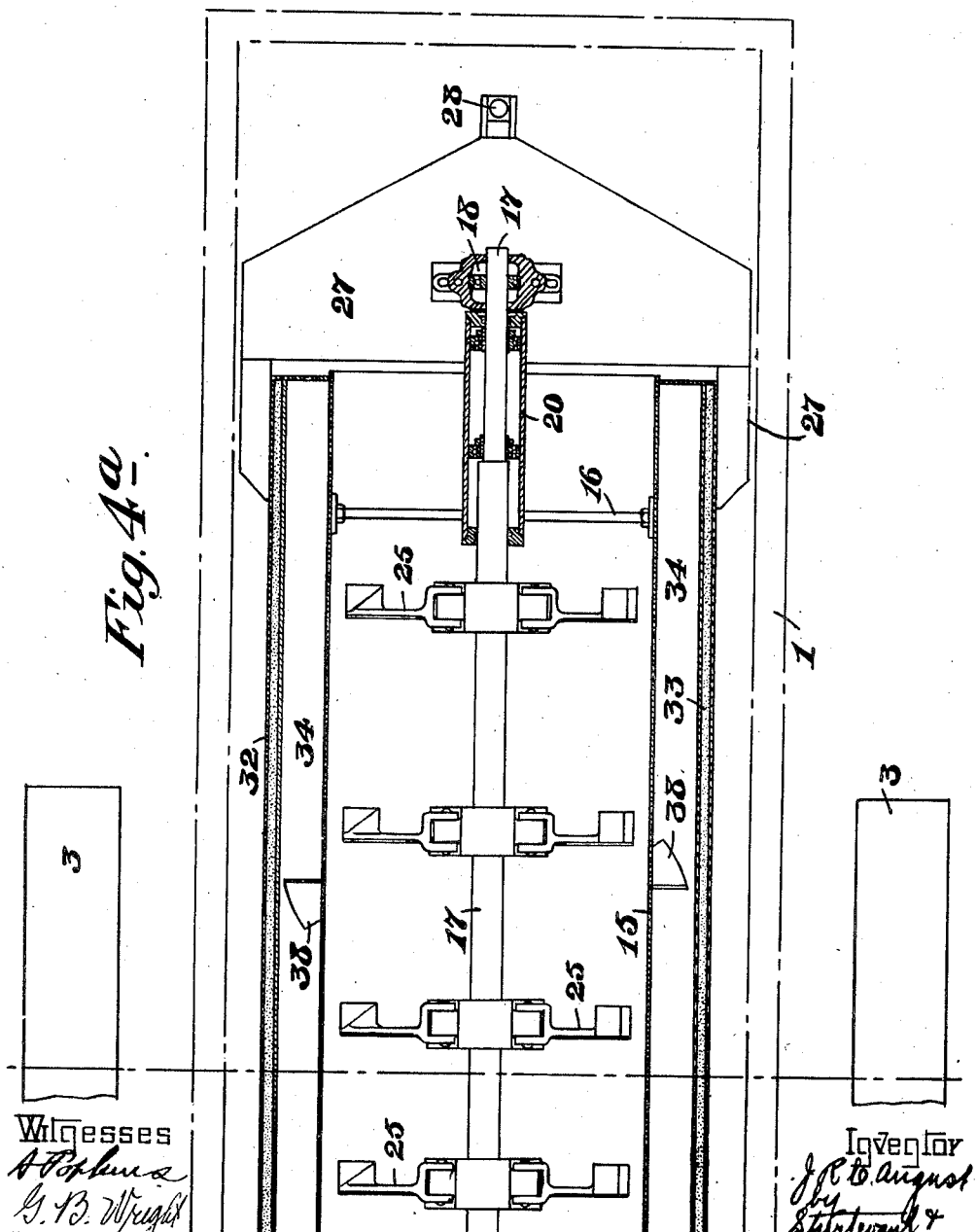

J. R. C. AUGUST.
METHOD FOR THE TREATMENT OF SOIL.
APPLICATION FILED NOV. 21, 1918.

1,303,149.

Patented May 6, 1919.
9 SHEETS—SHEET 9.

UNITED STATES PATENT OFFICE.

JOHANNES ROBERT CARL AUGUST, OF HALIFAX, ENGLAND.

METHOD FOR THE TREATMENT OF SOIL.

1,303,149. Specification of Letters Patent. Patented May 6, 1919.

Application filed November 21, 1918. Serial No. 263,510.

*To all whom it may concern:*

Be it known that I, JOHANNES ROBERT CARL AUGUST, a subject of the King of Great Britain, residing at Halifax, Yorkshire, in the Kingdom of England, have invented certain new and useful Improvements in Methods for the Treatment of Soil, of which the following is a specification.

The present invention has reference to certain improvements in the treatment of arable, that is agricultural or horticultural soil to improve its productivity.

In any process of this kind it is of great importance to so treat the soil that all the destructive organisms in it shall be killed, and yet avoid killing the bacteria which are the fertilizing instruments and which include among them the nitrate producing elements. Accordingly the aim and object of my invention is to produce a process of treating the soil, so as to destroy the organisms that feed upon the bacteria, thus allowing the fertilizing bacteria to more freely multiply and thereby improve the productivity of the soil. My invention also comprises a machine suited for employment in the field or within the area of any other piece of ground that is to be cultivated to carry out the process referred to.

The treatment of the soil is effected according to my invention by breaking up the earth in the ground to be treated, lifting the broken earth into and passing it through a continually rotating cylinder raised above the surface of ground, disintegrating the earth within the cylinder into a fine state of division (or suspension) so that its particles shall be separated from each other injecting a stream of radiant heat (such as a flame produced by a jet of gas and air) through the cylinder in a direction opposite to that in which the particles of disintegrated earth are passing, so that the particles of the soil are individually and uniformly acted upon by the heat, this treatment being maintained for a period whose duration is not long enough to insure that quite all the moisture is evaporated out of the soil, and finally delivering the treated soil over substantially the place in the ground from where it was removed. Water cannot be made hotter than 100 degrees C. however much the heat, and however long the heat is supplied. Consequently the pulverized soil cannot be raised above the said temperature of 100° so long as some moisture is present in the soil, and therefore no burning or scorching of the soil will take place, and the heat of the soil will always be maintained at a temperature below that at which the whole of the useful bacteria are destroyed. Some of the useful bacteria are no doubt killed by my process, but those that are left soon multiply in the absence of the destructive organisms, all of which are destroyed by my system. When heating partly broken blocks or masses of earth by apparatus proposed prior to my invention, so many thermal units are required to perform the operation and the heating of the soil is not uniform because the interior portion of the partly broken blocks will receive much less heat than the exterior surfaces, but by my process of disintegrating the earth into a fine state of division and suspension each particle is individually and uniformly attacked by the heat, fewer thermal units are required to do the work, and the desired result is more quickly achieved. My process therefore involves getting the soil in the rotating cylinder fine enough for its individual particles to be efficiently heated by the flame which is projected into them and the conversion of part of the moisture in the soil into steam, which steam effects the destruction of the injurious organisms without however destroying the vegetable matter in the soil, or the whole of the fertilizing bacteria.

It is possible that other beneficial effects on the productivity of the soil may also accrue by this process of treatment besides that above mentioned of destroying the destructive organisms, while preserving the useful bacteria and the vegetable matter. These other effects while not at the moment obvious, may show themselves as the result of further experience.

The machine for carrying out my process is adapted to move over the land by its own power or to be drawn thereover by tractive means and forms the subject-matter of a separate application filed as a division hereof on the 25th day of March, 1919, Serial No. 284,969. It is of the type comprising means to break up the earth in the ground, a rotating cylinder in which the soil is treated, and means for projecting a stream of burning combustible into the rotating cylinder. My machine comprises certain improvements on apparatus heretofore proposed such improvements (which will be understood from the following description reference being had to the accompanying drawings) being designed to carry into practical effect the process hereinbefore referred to.

In these drawings:—

Figure 5:
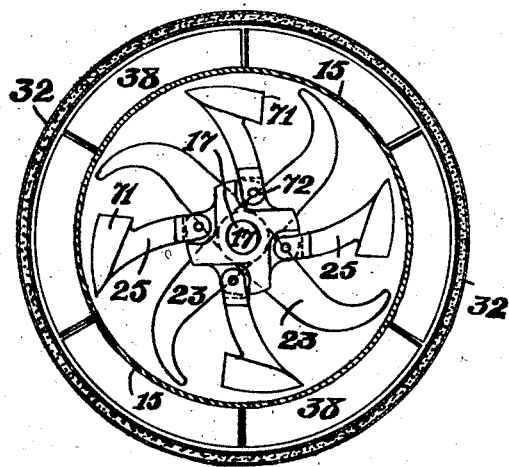

Figure 1, and Fig. 1^A which is a continuation of Fig. 1 show a side elevation of the complete machine;

Fig. 2, and Fig. 2^A are plan views thereof;

Fig. 3 and Fig. 3^A show a longitudinal section, Fig. 3^A being a continuation of Fig. 3;

Fig. 4 and Fig. 4^A are sectional plan views thereof;

Fig. 5 is a cross section on the line C C of Fig. 3^A.

The machine comprises a frame 1 provided with steering wheels 2 and driving wheels 3 which are driven by chain gearing or the like from a countershaft such as 22, which in turn is driven by a first motion shaft 5 and second motion shaft 22 from a prime mover mounted on the frame, such prime mover being conveniently an internal combustion engine 6. A suitable share 7 is carried by a hanger 8 and stay rods 9, at the front of the frame adapted to break up the earth in the ground to be treated. Behind the share 7 is arranged a trough 10 sloping upward and a lifting conveyer 11 driven by gearing from the countershaft 22, and adapted to feed the earth that has been broken up by the share to a hopper or chute 14 carried by the frame 1. Through this chute the broken earth falls into the front end of a rotating cylinder 15 such cylinder being raised above the surface of the ground. Such cylinder is by means of spiders 16 mounted freely on a central shaft 17 journaled in bearings 18 and adapted to be driven by a bevel wheel 19 secured to the boss 20 of one of the spiders from a bevel wheel 21 on the countershaft 22 which is operated by the prime mover 6. This central shaft 17 runs freely through the bushes 20 of the spiders 16 in the cylinder 15, and has stirring or cutting arms 23 inside the cylinder at the end where the broken earth is fed into it and the said shaft 17 is driven by a bevel wheel 24 which gears with the bevel wheel 21 on the countershaft 22 in such manner that the central shaft 17 rotates in the opposite direction to the cylinder 15. These cutters are set in such a way as to cause the earth to travel toward the rear end of the cylinder, and at the same time break up or partly disintegrate the clods or pieces of earth. Breakers or disintegrators 25 are also secured to the said central shaft 17 at spaced intervals apart inside the cylinder 15 such breakers also rotating in the opposite direction to the cylinder and adapted to disintegrate the earth within the cylinder into a fine state of division or suspension so that its particles shall be separated from each other. The said beaters are also set in such a way as to cause the earth to travel along the cylinder or barrel 15. This cylinder 15 together with its central shaft 17 slopes downwardly when in operation toward the rear of the machine, and this slope together with the action of the breakers 25 causes the disintegrated soil to travel toward the rear end of the cylinder 15. The plane of inclination of the cylinder and shaft can be varied so as to enable the time taken by the earth to travel through the cylinder to be adjusted at will, and the means for adjusting the inclination will be described presently. Into the rear end of the cylinder 15 toward which the disintegrated earth is passing, a stream of radiant heat is projected, such as a flame produced by a jet 30 of gas and air. This stream of heat travels in a direction opposite to that in which the particles of disintegrated soil are passing, so that the individual particles of the soil are individually and uniformly acted upon by the heat and the heated soil before quite all the moisture is evaporated out of it, is delivered at the end of the cylinder 15 opposite to that at which it was fed in, and over substantially the place in the ground from whence it was removed.

The rotating cylinder 15 is inclosed within an outer non-rotating jacket 32 made of inner and outer concentric casings the space between which is packed with heat insulating material 33 to conserve the heat, the annular space 34 between the jacket and the cylinder forming a flue, along which the stream of heat (after being projected forwardly into the cylinder and into and around the particles of soil which are being passed therethrough), travels back to the end of the cylinder where the jet is. This is for the purpose of keeping up the temperature of the inner surfaces of the cylinder 15, preventing the deposition of water thereon from the expanding steam which is evaporated out of the soil, and conserving the heat as much as possible.

The front end of the outer jacket is partly closed by a baffle 35, only sufficient opening being left to allow the soil to be fed into the cylinder at the forward end, so that the heat is led into the space 34 by the baffle. The rearward end of the jacket has a hood 37 by means of which a part of the heat passing through the jacketed space will enter the inside of the cylinder 15 again so that a constant circulation of the heat through the cylinder and back through the jacketed space 34 is set up. The outside of the cylinder 15 (inside the jacketed space) is furnished with non-continuous helical vanes 38 to induce a current of heat to travel back through the said jacket and then by means of the hood is diverted into the cylinder again.

The bearings 18 for the front end of the shaft 17 and the non-rotating jacket at its front end are carried on a frame or bracket which is fulcrumed at 22 and on the trunnion 26, the axis of the trunnion 26 being coincident with the axis of the shaft 22 so that the inclination of the shaft 17 and the cylinder 15 together with the outer jacket 32 can be adjusted without disturbing the driving gear 19, 21 and 24. At its rear end the jacket 32 is provided with a yoke 27 which carries a plate upon which is mounted the bearing 18 in which the rear end of the shaft is journaled, and to this yoke is pivoted an upstanding screwed spindle 28. On this screwed spindle is mounted a hand wheel 29 having a screw threaded center boss whose threads mesh with the threads on the spindle 28, the said hand wheel resting upon a bracket supported by the main frame 1 so that by turning the hand wheel in one direction or the other, the jacket together with the cylinder 15, the shaft 17, and their accessory parts is raised or lowered on the fulcrum 26 to vary the inclination, as may be required to regulate the speed at which the earth is passed through the cylinder.

The steering wheels 2 at the front end of the frame 1 are turned by worm and worm wheel gearing from a shaft 40 having a hand wheel 41 conveniently arranged adjacent to the seat 42 for the driver, and means are provided by which the front end of the frame can be raised or lowered so as to determine the depth of soil which is broken up by the plow share. This is effected in the following manner. The carriage or fork 43 in which the axle of the steering wheels 2 is mounted, is provided with a screw threaded pillar 44 which forms the steering axis. Upon this screw threaded pillar 44 is mounted a nut 45 to which the worm wheel 46 is solidly keyed, the nut being journaled in a bearing member 47 secured to the frame or chassis 1, so that it can freely revolve but is incapable of longitudinal movement independent of the bearing member 47. Below the nut 45 there is splined on to the screwed pillar 44 a sliding clutch member 48 which can be slipped by means of a lever either toward or away from the counterpart end of the nut 45, the opposing faces of the clutch and the nut having coacting projections and interdental spaces. When the clutch 48 is disengaged as shown in Fig. 3 and the steering wheel 41 is turned, the nut 45 revolves on the screw 44 by the operation of the worm 49 and worm wheel 46, thereby raising or lowering the front of the machine as desired. When however the clutch 48 is engaged, the nut 45 (when the steering hand wheel 41 is turned) revolves the splined clutch 48 and this turning of the clutch turns the steering pillar 44, thereby turning the wheels 2 and steering the machine. The clutch is operated by a hand lever 50 arranged near the driver's seat 42, the said lever operating the clutch through the rod 51, bell crank 52 and link 53. Another hand lever 54 is also arranged near the driver's seat which operates through a rod 55 lever 56 and other gear a clutch 57 on the first motion shaft 5 for throwing all the moving parts of the apparatus into and out of the gear with the prime mover 6, so that the moving parts of the apparatus can be stopped without stopping the prime mover. A suitable foot brake 59 is provided in connection with one of the road wheels, also an indicator 60 is provided in front of the driver's seat to record the temperature of the treated soil.

The radiator 62 besides serving the purpose of cooling the internal combustion engine 6, also provides the burner 30 with heated air for combustion. Liquid fuel contained in the tank 63 is led by pipes 64 to the hydrocarbon burner 30, and a fan 65 driven from the first motion shaft 5 by a belt 69 draws air through the radiator 62 by way of the mouthpiece 66 and pipe 67 to the said burner 30 where it mixes with the jet of burning liquid fuel to support combustion. The tank for the supply of fuel to the engine is indicated at 68.

The breakers comprise arms 25 radiating from a boss 70 secured to the shaft 17 and provided with hammer heads 71 at the outer ends such heads (and also the arms) having beveled sides converging toward the front edges so as to cut or hack through the earth and dash it to pieces, in fact reduce it to a fine state of division. The arms 25 are pivoted to the boss 70 by means of stop hinges 72 so arranged as to allow the arms to freely turn rearwardly on their hinge pins. The arms with their hammer heads are however kept radial by centrifugal force so long as the shaft 17 revolves, but the stop hinges allow the said headed arms to give rearwardly should they strike any solid obstruction such as a stone, and thus allow the obstruction to pass them. It is proposed that the cylinder and the shaft inside it shall turn at a speed of about 430 revolutions per minute in opposite directions.

The mode of operation is as follows:—The inclination of the cylinder 15 with its central shaft 17 having been adjusted so as to cause the earth to travel longitudinally through the cylinder at the desired rate of speed, and the burner 30 having been lighted so as to inject a stream of radiant heat or burning combustible into the cylinder 15 and thus heat the individual particles of soil passing therethrough, the whole vehicle is traversed over the field or other area of ground which is to be cultivated, the driver controlling it by the steering handle 41 from his seat 42. As the vehicle travels forward the share 7 or shares enter the ground and break up the earth to be treated to the required depth such as that indicated at 73 which is thereupon lifted by the lifting conveyer 11 and passed into the inclined rotating cylinder 15 at the forward end whereupon the soil comes within the range of the stream of radiant heat. Such cylinder 15 as aforesaid is located above the surface of the ground, and the stirring arms 23 inside it first attack the clods or pieces of earth and partly disintegrate them; then as the broken earth travels through the cylinder 15 it is attacked by the beaters 25 which thoroughly disintegrate the soil and get it fine enough for its individual particles to be efficiently and uniformly heated by the flame or stream of radiant heat which is projected into or among them by the burner 30, and finally the treated soil is delivered from the rear end of the cylinder 15 over substantially the place in the ground from whence it was removed. The temperature attained by the soil during its passage through the cylinder 15 is determined partly by the intensity of the flame and partly by the period during which the particles are under treatment by the heat, and this period can be regulated by varying the inclination of the rotating cylinder 15 so that the treatment shall be maintained for a period whose duration is not long enough to insure that quite all the moisture is evaporated out of the soil. If this condition be maintained, then it follows that the disintegrated soil cannot be raised above the temperature of 100° centigrade and therefore no burning or scorching of the soil will take place, as its temperature will be maintained below that at which the whole of the useful bacteria are destroyed. It will be now understood that this apparatus carries my process into practical effect, the soil within the rotating cylinder 15 being reduced fine enough for its individual particles to be efficiently and uniformly heated by the stream of burning combustible or radiant heat which is projected into them, and part of the moisture in the soil being converted into steam which steam effects the destruction of the injurious organisms without however destroying the vegetable matter in the soil, or the whole of the fertilizing bacteria. The interior of the cylinder 15 when the stream of disintegrated earth and the stream of radiant heat from the burner 30 are passing through it in opposite directions, might be compared or likened to a heated fine mesh sieve, the stream of radiant heat being representative of the heated wires of the sieve and the particles of earth being representative of the holes in the sieve, and this comparison serves to illustrate that the heat percolates uniformly between and around every particle of the earth so that all the particles are individually acted upon by the heat. Furthermore fewer thermal units are required to perform the operation than is the case with known apparatus which attempt to apply a flame or radiant heat to fragments or clods of earth constituting a layer of turned over earth lying upon the surface of the ground itself.

The nature of the invention and the manner of carrying it into practical effect will now be apparent. It must be understood however that I do not limit myself to the precise details of the apparatus described, as alterations can be made which while they might change the appearance of the machine, would not involve a departure from the scope of the invention herein set forth.

I declare that what I claim is:—

1. The method of treating soil to improve its productivity, which consists in breaking up the earth in the ground to be treated, lifting the broken earth into and passing it through a confined space at a level above the surface of the ground, disintegrating the earth within said space into a fine state of division so that its particles shall be separated from each other, injecting a stream of radiant heat through said space in a direction opposite to that in which the particles of disintegrated earth are passing, such treatment being maintained for a period whose duration is not long enough to insure that quite all the moisture is evaporated out of the soil, and finally delivering the treated soil over substantially the place in the ground from whence it was removed.

2. The method of treating soil to improve its productivity, which consists in passing it through a confined space at a level above the surface of the ground, getting the soil during its passage through said space fine enough for its individual particles to be efficiently and uniformly heated by a stream of radiant heat which is projected into them, and the conversion of part of the moisture in the soil into steam, which steam effects the destruction of the injurious organisms without however destroying the vegetable matter in the soil, or the whole of the fertilizing bacteria.

3. The method of treating arable soil which consists in finely disintegrating the soil and causing the particles to travel a long circuitous path within a short confined space in countercurrent with a supply of heated gases, and continuing said treatment until injurious organisms are destroyed while preserving desirable organic material.

4. The method of treating arable soil which consists in causing finely disintegrated soil to be very rapidly whirled within a confined space in contact with a countercurrent of heated gases for a very short time sufficient to destroy injurious organisms, so that the treated soil still contains some moisture.

In witness whereof I have hereunto signed my name this 22d day of October, 1918, in the presence of two subscribing witnesses.

JOHANNES ROBERT CARL AUGUST.

Witnesses:
ROBERT KENWORTHY,
WILLIAM FOX.